Patented Nov. 16, 1926.

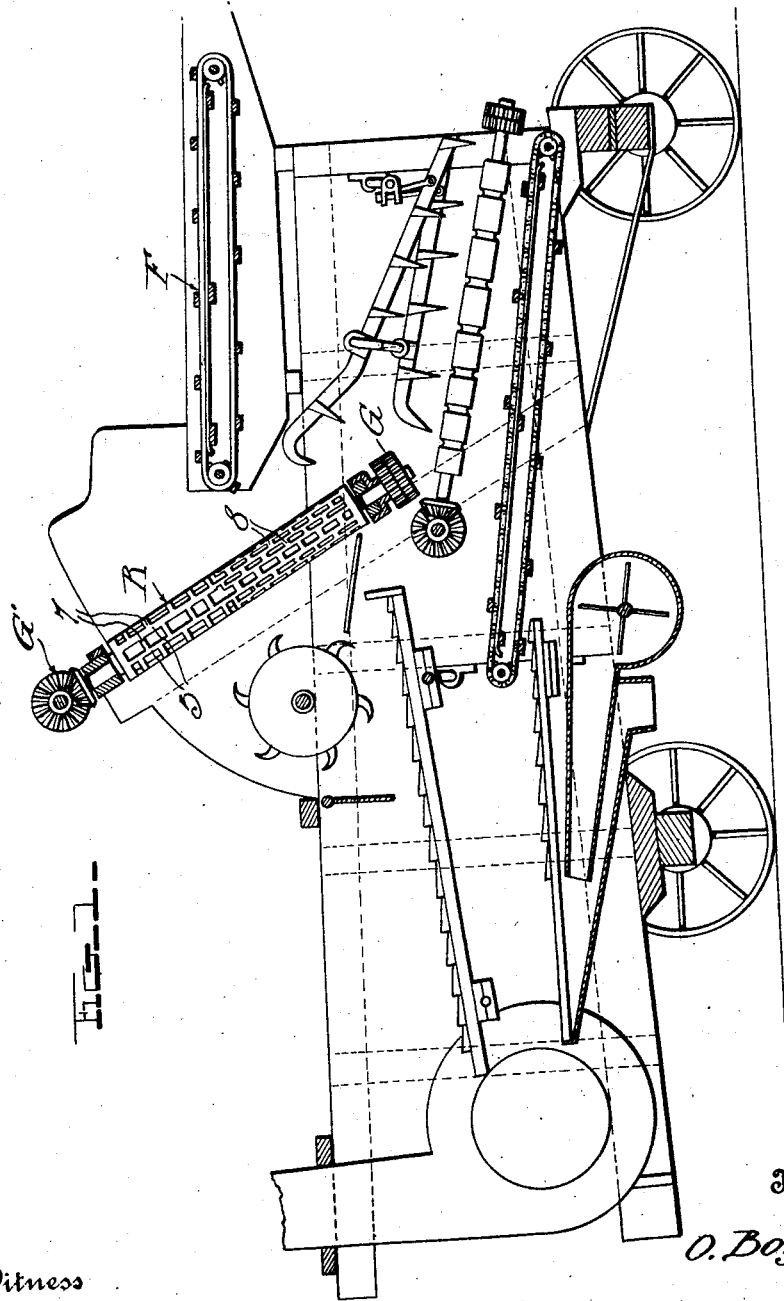

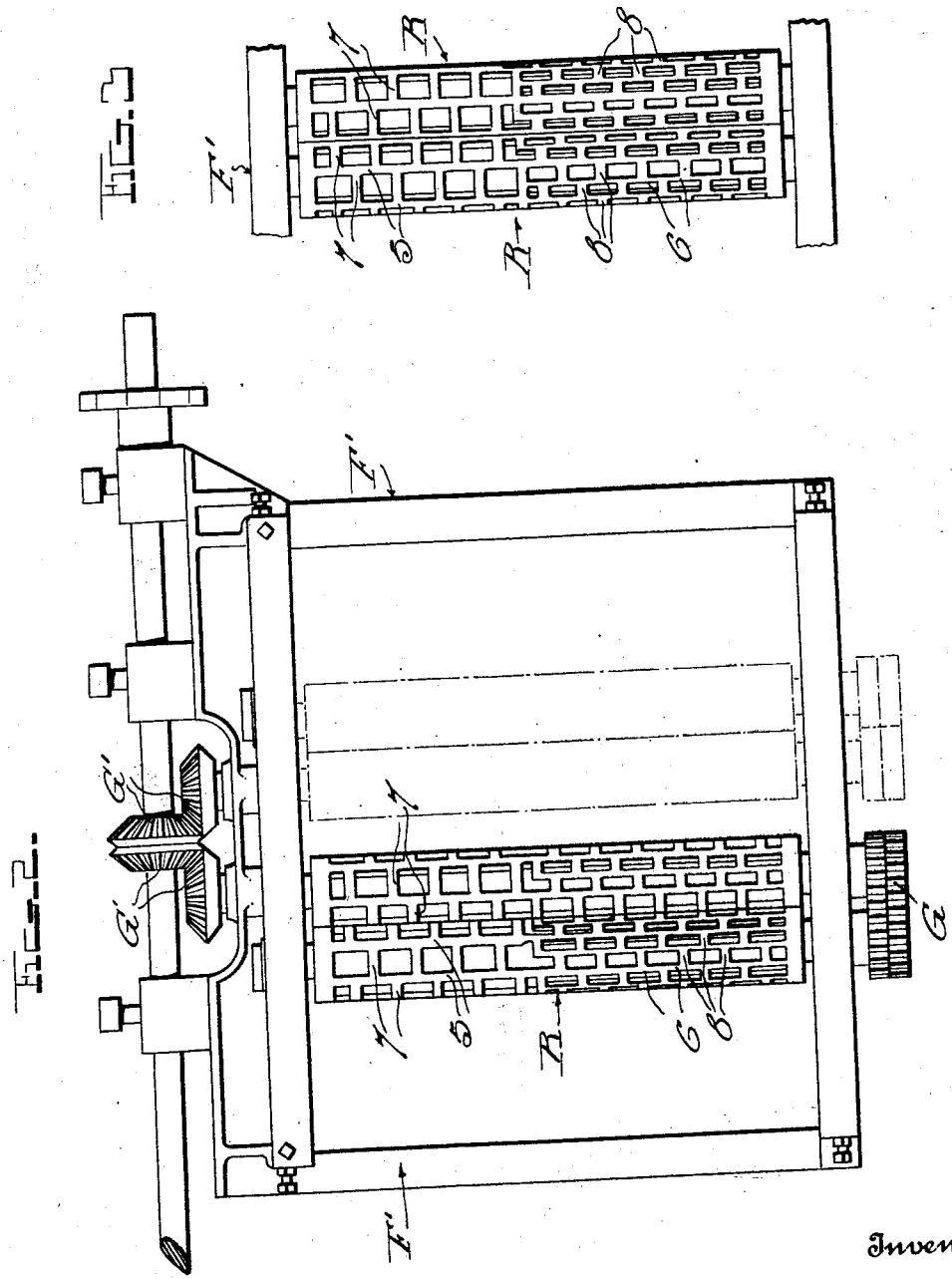

1,607,429

UNITED STATES PATENT OFFICE.

OLIVER BOYER, OF SPENCERVILLE, OHIO.

VERTICAL SNAPPING ROLL FOR CORN HUSKING AND SHREDDING MACHINES.

Application filed July 12, 1926. Serial No. 121,973.

The invention relates to improvements in corn husking and shredding machines, such as those shown in my U. S. Patents Numbers 1,461,748 and 1,525,063. In both of these patents, corn husking and shredding machines are shown, embodying substantially vertical snapping rolls for snapping the ears from the corn stalks, said snapping rolls having widely spaced longitudinal ribs at their upper portions and closely spaced longitudinal ribs at their lower portions. In practice, it has been found that the corn stalks, when they engage rolls of this type, have a tendency to slide upwardly along the rolls, instead of being immediately gripped by the latter and carried on to the shredding means. It is the object of the present invention, therefore, to improve upon the construction of the snapping rolls, in such a manner as to prevent the stalks from upwardly sliding along said rolls. Thus, the stalks are immediately gripped by the rolls as soon as they contact therewith and the operation of the machine is thus greatly bettered.

With the foregoing in view, the invention resides in the novel subject matter hereinafter described and claimed, the description being supplemented by the accompanying drawings.

Figure 1 is a longitudinal sectional view showing a corn husking and shredding machine embodying the improved snapping rolls.

Figure 2 is a side elevation showing one pair of the snapping rolls and associated parts.

Figure 3 is an elevation showing the manner in which the rolls may be timed in a different manner from the disclosure of Figure 2.

The general construction of the machine as a whole, is fully shown and described in the patents above referred to and need not here be explained, as the gist of the present invention is in the construction of the snapping rolls R. Attention however may be directed to the fact that these rolls are disposed in substantially vertical positions, behind the feeder F. These rolls may be mounted in any desired manner in a suitable frame F'. As usual, the rolls R are disposed in pairs, and the rolls of each pair are connected for simultaneous rotation in opposite directions, staggered-tooth gears G being preferably employed for this purpose. One roll of each pair is suitably driven, for instance by bevel gearing G' and suitable shafting.

Each roll R is provided substantially throughout the length of its upper half with a plurality of widely spaced longitudinal ribs 5, while substantially the lower half of each roll is formed with a plurality of closely spaced longitudinal ribs 6. This was also true of the machines shown by the patents above referred to, but as above stated, it was found that the corn stalks often had a tendency to slide upwardly along the rolls, instead of being immediately gripped by the latter and carried onto the shredding means. To overcome this difficulty, I provide transverse staggered ribs 7 on the upper portions of the rolls, having their ends integrally joined to the longitudinal ribs 5, and at the lower portions of said rolls, I provide similar, transverse, staggered ribs 8 which extend between and are integral with longitudinal ribs 6. These transverse ribs, effectively prevent the corn stalks from upwardly sliding along the rolls and insure that the stalks shall be immediately gripped by the rolls and carried on, by the latter, to the shredding means.

I am aware that both longitudinal and transverse ribs have heretofore been used in the art, but the transverse ribs have not had the same function as in the present application. My prior patented machines, differed from previous machines, in that the snapping rolls were vertically disposed, and when it was discovered that the stalks had a tendency to slide upwardly along these rolls, I could find no suggestion in the prior state of the art, of any means to overcome the difficulty. Hence, after attempts at attaining the desired results in other ways, I discovered that the use of transverse ribs between the longitudinal ribs, would produce the desired end. Moreover, by making use of the novel association of ribs herein disclosed, I produce snapping rolls which may be timed in three different ways, according to corn condition, that is, the rolls may be relatively set so that the ribs of one may assume any one of three different relations with the ribs of the other. Thus, all conditions, which are commonly encountered, may be readily met and the machine made to operate efficiently regardless of the condition of the corn.

The particular type of roll which I have devised, is intended only for use in connection with a corn husking and shredding machine in which the snapping rolls are disposed substantially in vertical position. The corn stalks when fed into the machine by the feeder with the butts first, enter the coarse upper portions of the rolls. As the stalks are drawn through the rolls, said stalks gradually work their way downward to the finer portions of the rolls, where the ears of corn are snapped off, which prevents shelling of kernels from the ears.

I claim:—

1. In a corn husking and shredding machine having a substantially horizontal feeder and substantially vertical snapping rolls at the inner end of said feeder; longitudinally disposed widely spaced ribs on the upper portions of said rolls spaced equidistantly around the entire circumference thereof, closely spaced longitudinal ribs on the lower portions of said rolls, and transverse ribs on said upper portion of the rolls and on said lower portion thereof, said transverse ribs extending between all of said longitudinal ribs and serving to prevent upward sliding of the corn stalks along the rolls.

2. A structure as specified in claim 1; said transverse ribs being disposed in staggered relation.

3. In a corn husking and shredding machine having a substantially horizontal feeder and substantially vertical snapping rolls at the inner end of said feeder; longitudinal ribs on said rolls spaced equidistantly around the entire circumference thereof and transverse ribs on said rolls, said transverse ribs extending between all of said longitudinal ribs and serving to prevent upward sliding of the stalks along the rolls.

4. A structure as specified in claim 3; said transverse ribs being disposed in staggered relation.

In testimony whereof I have hereunto affixed my signature.

OLIVER BOYER.